US006323853B1

(12) United States Patent
Hedloy

(10) Patent No.: US 6,323,853 B1
(45) Date of Patent: Nov. 27, 2001

(54) METHOD, SYSTEM AND COMPUTER READABLE MEDIUM FOR ADDRESSING HANDLING FROM A COMPUTER PROGRAM

(75) Inventor: Atle Hedloy, Stabekk (NO)

(73) Assignee: Arendi AS, Stabekk (NO)

( * ) Notice: Subject to any disclaimer, the term of this patent is extended or adjusted under 35 U.S.C. 154(b) by 0 days.

(21) Appl. No.: 09/189,626

(22) Filed: Nov. 10, 1998

(30) Foreign Application Priority Data

Sep. 3, 1998 (NO) .................................................. 984066

(51) Int. Cl.⁷ .................................................. G06F 17/00
(52) U.S. Cl. .......................... 345/339; 345/968; 707/530
(58) Field of Search .................................. 345/326, 333, 345/335, 336, 339, 347, 348, 968, 354, 356; 707/1, 3, 500, 503, 505, 507, 530, 501, 513, 515

(56) References Cited

U.S. PATENT DOCUMENTS

| 5,226,117 | 7/1993 | Miklos .................................. 345/356 |
| 5,331,555 | 7/1994 | Hashimoto et al. .................. 707/531 |
| 5,416,901 | 5/1995 | Torres .................................... 345/348 |
| 5,491,783 | 2/1996 | Douglas et al. ....................... 345/335 |
| 5,491,784 | 2/1996 | Douglas et al. ....................... 345/352 |
| 5,500,859 | 3/1996 | Sharma et al. ........................ 370/468 |
| 5,530,853 | 6/1996 | Schell et al. .............................. 701/1 |
| 5,546,447 | 8/1996 | Skarbo et al. ......................... 379/142 |
| 5,606,712 | 2/1997 | Hidaka ..................................... 712/1 |
| 5,640,565 | 6/1997 | Dickinson .............................. 707/103 |
| 5,666,502 | 9/1997 | Capps ..................................... 345/352 |
| 5,708,804 | 1/1998 | Goodwin et al. ......................... 707/3 |
| 5,724,597 | * 3/1998 | Cuthbertson et al. ................. 707/531 |
| 5,732,229 | * 3/1998 | Dickinson ............................. 345/334 |
| 5,761,656 | 6/1998 | Ben-Shachar ............................ 707/4 |
| 5,799,302 | * 8/1998 | Johnson et al. ........................... 707/7 |
| 5,805,886 | 9/1998 | Skarbo et al. ......................... 709/318 |
| 5,826,257 | 10/1998 | Snellling, Jr. ............................ 707/4 |
| 5,835,089 | 11/1998 | Skarbo et al. ......................... 345/335 |
| 5,859,636 | 1/1999 | Pandit .................................. 345/335 |
| 5,873,107 | * 2/1999 | Borovoy et al. ...................... 707/501 |
| 6,026,398 | * 2/2000 | Brown et al. ............................. 707/5 |
| 6,085,201 | * 7/2000 | Tso ....................................... 707/505 |

* cited by examiner

*Primary Examiner*—Crescelle N. dela Torre
(74) *Attorney, Agent, or Firm*—Oblon, Spivak, McClelland, Maier & Neustadt, P.C.

(57) ABSTRACT

A method, system and computer readable medium for providing for providing a function item, such as a key, button, icon, or menu, tied to a user operation in a computer, whereby a single click on the function item in a window or program on a computer screen, or one single selection in a menu in a program, initiates retrieval of name and addresses and/or other person or company related information, while the user works simultaneously in another program, e.g., a word processor. The click on the function item initiates a program connected to the button to search a database or file available on or through the computer, containing the person, company or address related data, in order to look up data corresponding to what the user types, or partly typed, e.g., name and/or address in the word processor, the correct data from the database, data related to the typed data, e.g., the name of the person, company, or the traditional or electronic address, or other person, or company, or address related data, and alternatively the persons, companies, or addresses, are displayed and possibly entered into the word processor, if such related data exists.

79 Claims, 17 Drawing Sheets

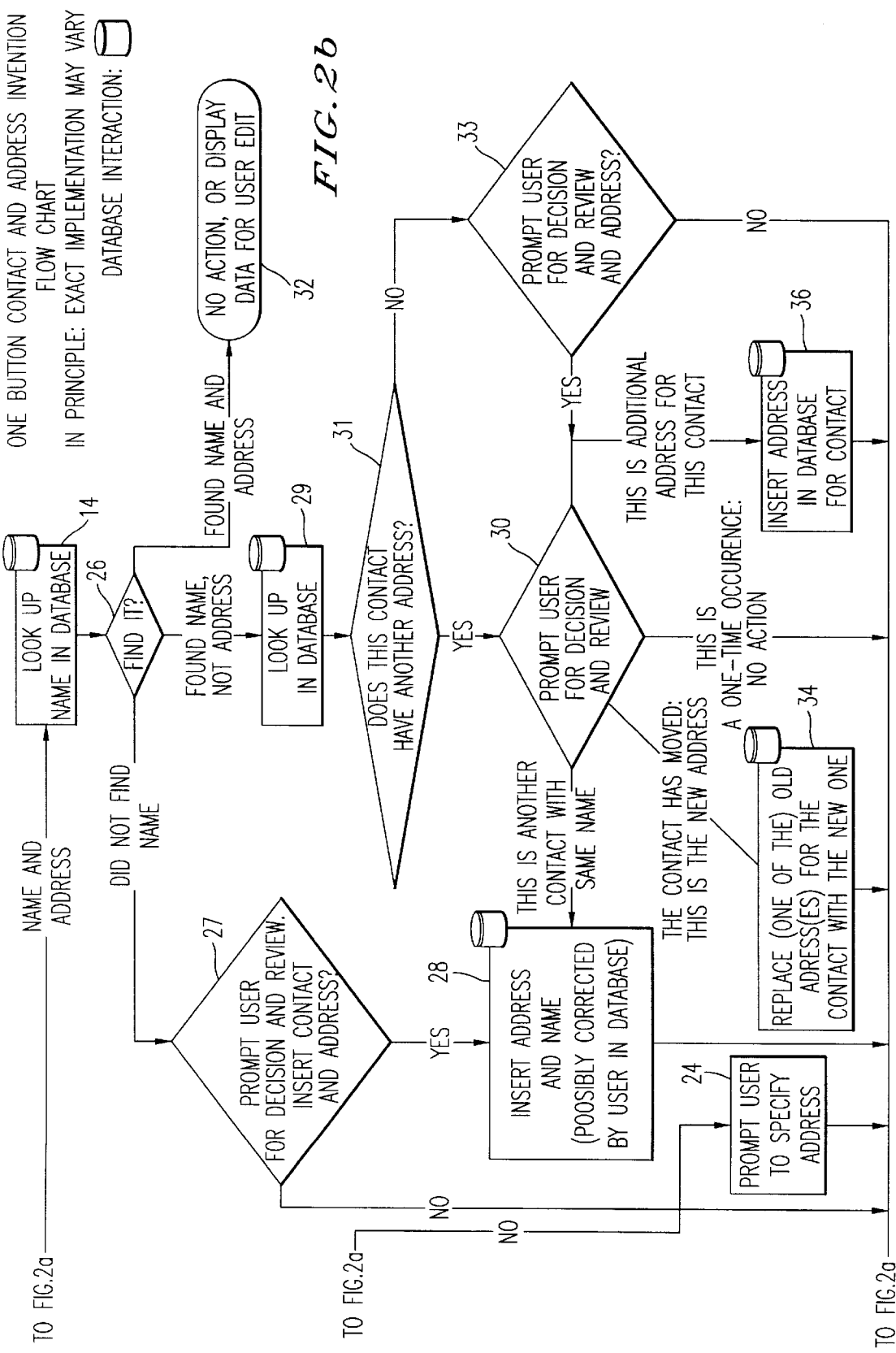

FIG. 11

Arendi OneButton Contact Register

Existing addresses with the same name

| Name | Addr. type | Address | Zip | City | Country |
|------|-----------|---------|-----|------|---------|
| [1] Hedley, Atle | Business | 113 Terrasse street | 12191-4292 | New York, | United States of... |
| | Home | 113113 Jacob Aall street | 12191-4292 | New York, | |

Name: Atle Hedley

Address:
113 Terrasse street
New York\NY 12191-4292
United States of America

[Choose]   [Full details...]

86   [<<<Less]

Name
- Title:
- First: Atle
- Middle:
- Last: Hedley
- Suffix:
- Company:

[Add and Choose]

Address type: Home
Street: 151 University Ave.
City: Palo Alto
State/Province: CA
Zip/Postal code: 94301-1632
Country: USA

[Add this address to the selected contact above]

[Options...]   [Cancel]

Dette er en test

FIG. 12

ମETHOD, SYSTEM AND COMPUTER
READABLE MEDIUM FOR ADDRESSING
HANDLING FROM A COMPUTER
PROGRAM

BACKGROUND OF THE INVENTION

1. Field of the Invention

This invention relates to a method, system and computer readable medium for name and address handling (hereinafter called "address handling"), and more particularly to a touch screen, keyboard button, icon, menu, voice command device, etc. (hereinafter called "button") provided in a computer program, such as a word processing program, spreadsheet program, etc., and coupled to an information management source for providing address handling within a document created by the computer program.

2. Discussion of the Background

In recent years, with the advent of programs, such as word processors, spreadsheets, etc. (hereinafter called "word processors") users may require retrieval of information, such as name and address information, etc., for insertion into a document, such a letter, fax, etc., created with the word processor. Typically, the information is retrieved by the user from an information management source external to the word processor, such as a database program, contact management program, etc., or from the word processor itself, for insertion into the document. Examples of such word processors are WORD™, NOTEPAD™, EXCEL™, WORDPAD™, WORDPERFECT™, QUATROPRO™, AMIPRO™, etc., and examples of such information management sources are ACCESS™, OUTLOOK™, ORACLE™, DBASE™, RBASE™, CARDFILE™, etc.

However, the information in the database must constantly be updated by the user. This requires the user to learn how to use and have access to the database. In this case, a change in the information, such as change in an address or a name, etc., requires the user of the word processor to implement this change in the database, or alternatively, the change is made to the database centrally by a database administrator.

SUMMARY OF THE INVENTION

Accordingly, an object of the present invention is to provide a method, system and computer readable medium for address handling within a computer program.

Another object of the present invention is to provide a method, system and computer readable medium for address handling within a computer program, such as a word processing program, spreadsheet program, etc.

Another object of the present invention is to provide a method, system and computer readable medium for address handling within a computer program, such as a word processing program, spreadsheet program, etc., using an input device provided in the computer program.

Another object of the present invention is to provide a method, system and computer readable medium for address handling within a computer program, such as a word processing program, spreadsheet program, etc., using an input device, such as a touch screen, keyboard button, icon, menu, voice command device, etc., provided in the computer program and coupled to an information management source.

Another object of the present invention is to provide a method, system and computer readable medium for address handling within a computer program, such as a word processing program, spreadsheet program, etc., using an input device, such as a touch screen, keyboard button, icon, menu, voice command device, etc., provided in the computer program and coupled to an information management source, such as a database program, contact management program, etc.

The above and other objects are achieved according to the present invention by providing a novel method, system and computer readable medium for providing a function item, such as a key, button, icon, or menu, tied to a user operation in a computer, whereby a single click on the function item in a window or program on a computer screen, or one single selection in a menu in a program, initiates retrieval of name and addresses and/or other person or company related information, while the user works simultaneously in another program, e.g., a word processor. The click on the function item initiates a program connected to the button to search a database or file available on or through the computer, containing the person, company or address related data, in order to look up data corresponding to what the user types, or partly typed, e.g., name and/or address in the word processor, the correct data from the database, data related to the typed data, e.g., the name of the person, company, or the traditional or electronic address, or other person, or company, or address related data, and alternatively the persons, companies, or addresses, are displayed and possibly entered into the word processor, if such related data exists.

The present invention also includes a computer readable medium storing program instructions by which the method of the invention can be performed when the stored program instructions are appropriately loaded into a computer, and a system for implementing the method of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein:

FIG. 11 is a screen shot illustrating a more detailed mode of registering an additional address for the contact register of FIG. 9, according to an exemplary embodiment of the present invention;

Figure 12:
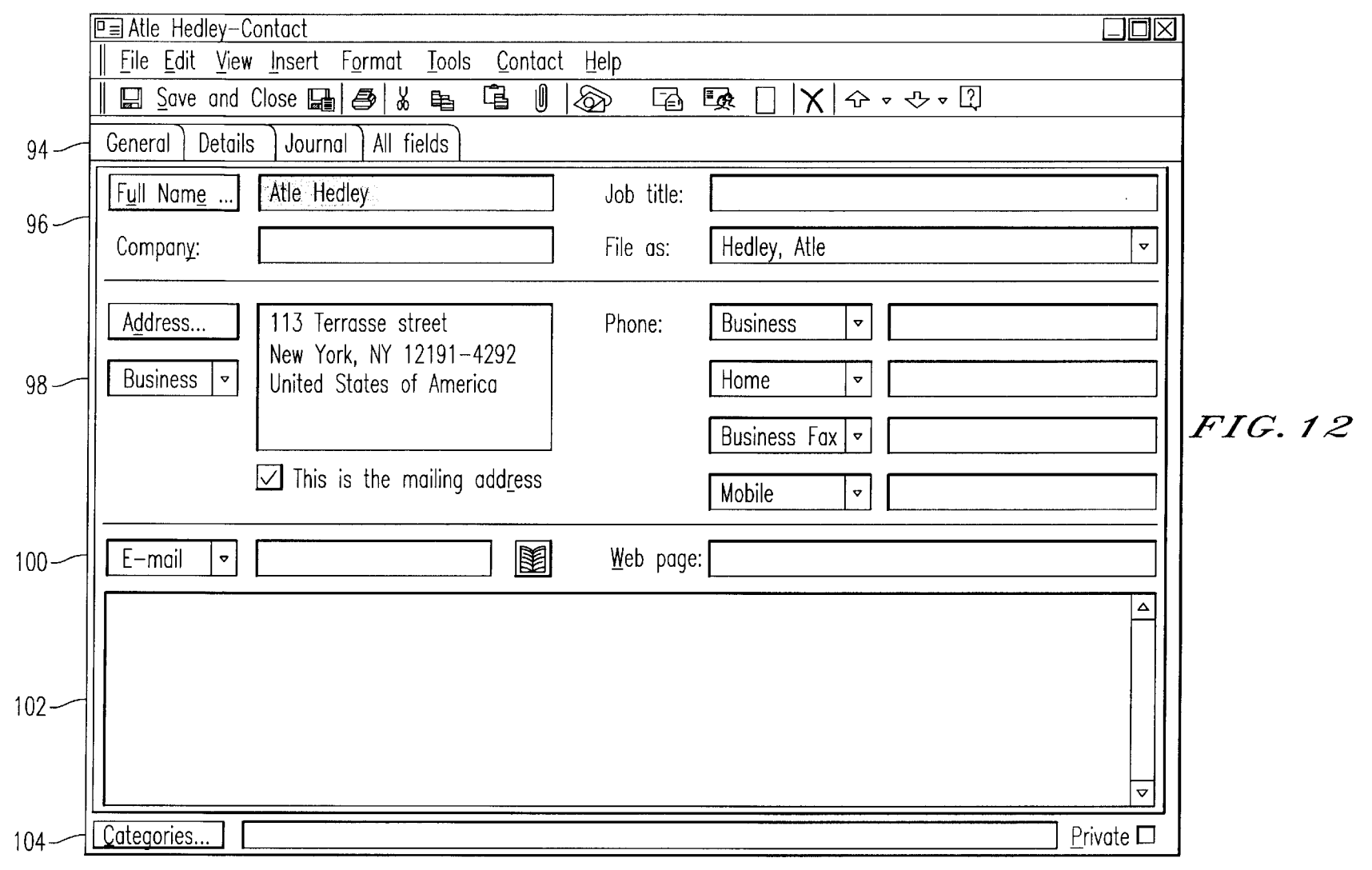

FIG. 12 is a screen shot illustrating a contact management program window in a full detailed mode, according to an exemplary embodiment of the present invention;

DESCRIPTION OF THE PREFERRED EMBODIMENTS

In an embodiment of the present invention, single button addressing is achieved by providing an input device, such as a touch screen, keyboard, icon, menu, voice command device etc. (hereinafter called "button"), in a computer program, such as a word processing program, spreadsheet program, etc. (hereinafter called "word processor"), for executing address handling therein.

Accordingly, in a word processor, the button is added and a user types information, such as an addressee's name, or a part of the name, etc. in a document created with the word processor, such as a letter, fax, etc., and then clicks, selects, commands, etc. the button via the appropriate input device, such as a touch screen button, keyboard button, icon, menu choice, voice command device, etc. A program then executes and retrieves the typed information from the document, and searches an information management source, such as a database, file, database program, contact management program, etc. (hereinafter called "database") to determine if the information, such as the name or part of the name typed and searched by the program exists in the database. If the program does not find stored information, such as a name, corresponding to the name or part of the name typed, the user is asked by the program whether the information, such as the name that was not found, should be added to the database. In addition, the user may enter any other information besides the name, such as addresses, businesses, telephone numbers, fax numbers, e-mail address, etc., so that this other information can be stored in the database for later use.

If the program finds name(s) and address(es) corresponding to the part of the addressee's name typed, this additional information is automatically entered into the user's word processor, optionally with a confirmation from the user that this is the correct data. If the typed address information does not correspond to data already stored in the database, after clicking on the button, the program, for example, lets the user decide: (1) if this is new data (e.g., a new address) for an existing contact; (2) if the stored data should be changed to what the user just typed; (3) if this is a new contact with the same name as one already entered into the database; or (4) if the typed address is only to be used once, and therefore not to be stored in the database at all. If, later, for example, a name with several address stored in the database is recalled, all addresses for this contact will be displayed, so that the correct address can be selected by the user.

The program may be extended to also store and retrieve other information, such as telephone numbers, fax numbers, e-mail addresses, etc. Once the program recalls the telephone numbers, fax numbers, e-mail addresses, etc., the user can command the program to send e-mails, faxes, etc. Similarly, if the user types in the name of a mailing list, the program create merge letters, group e-mails, etc.

Figure 1A:
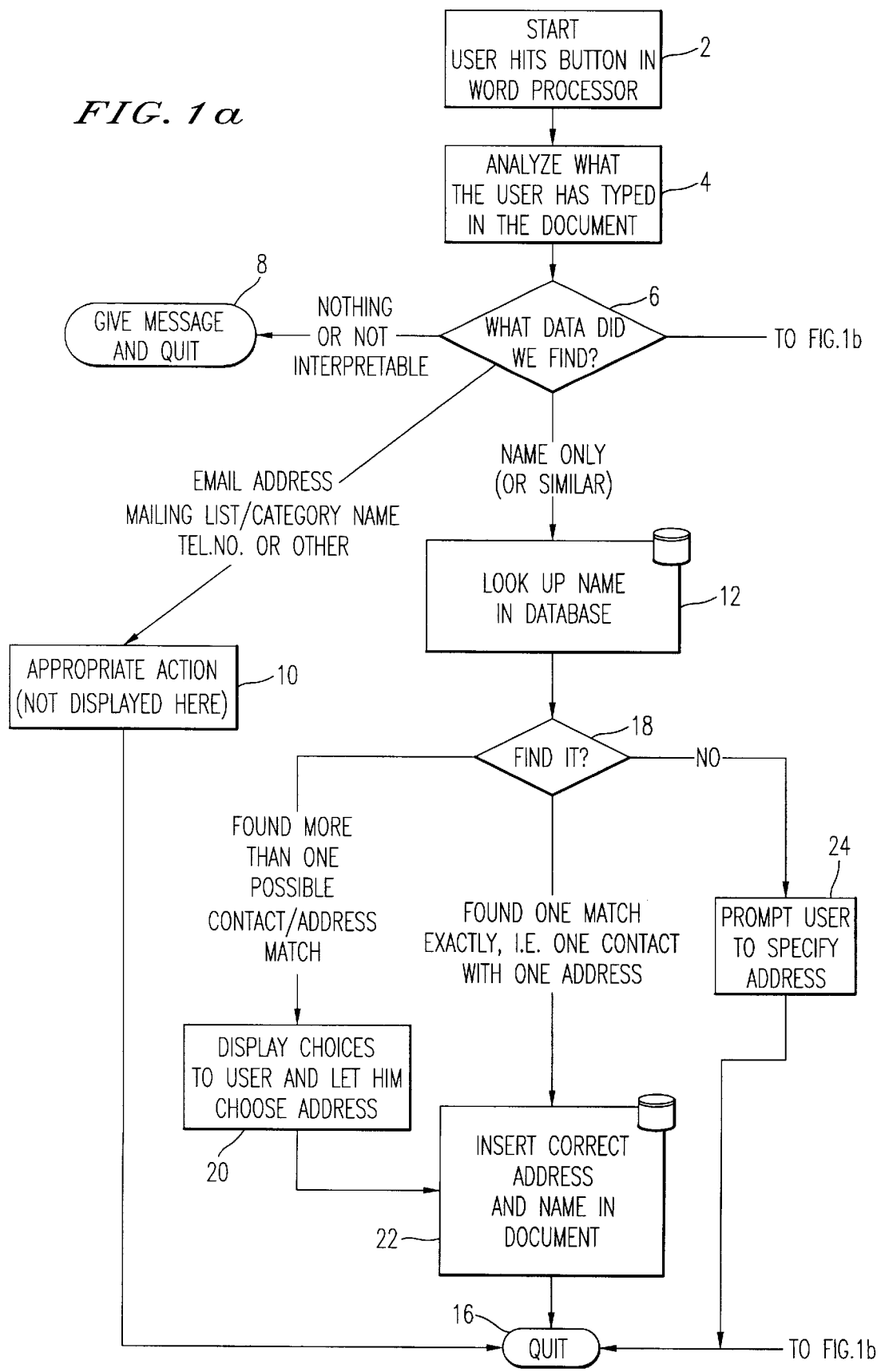
FIG. 1 is a flow chart illustrating a method for address handling within a computer program, according to an exemplary embodiment of the present invention.
Figure 1B:
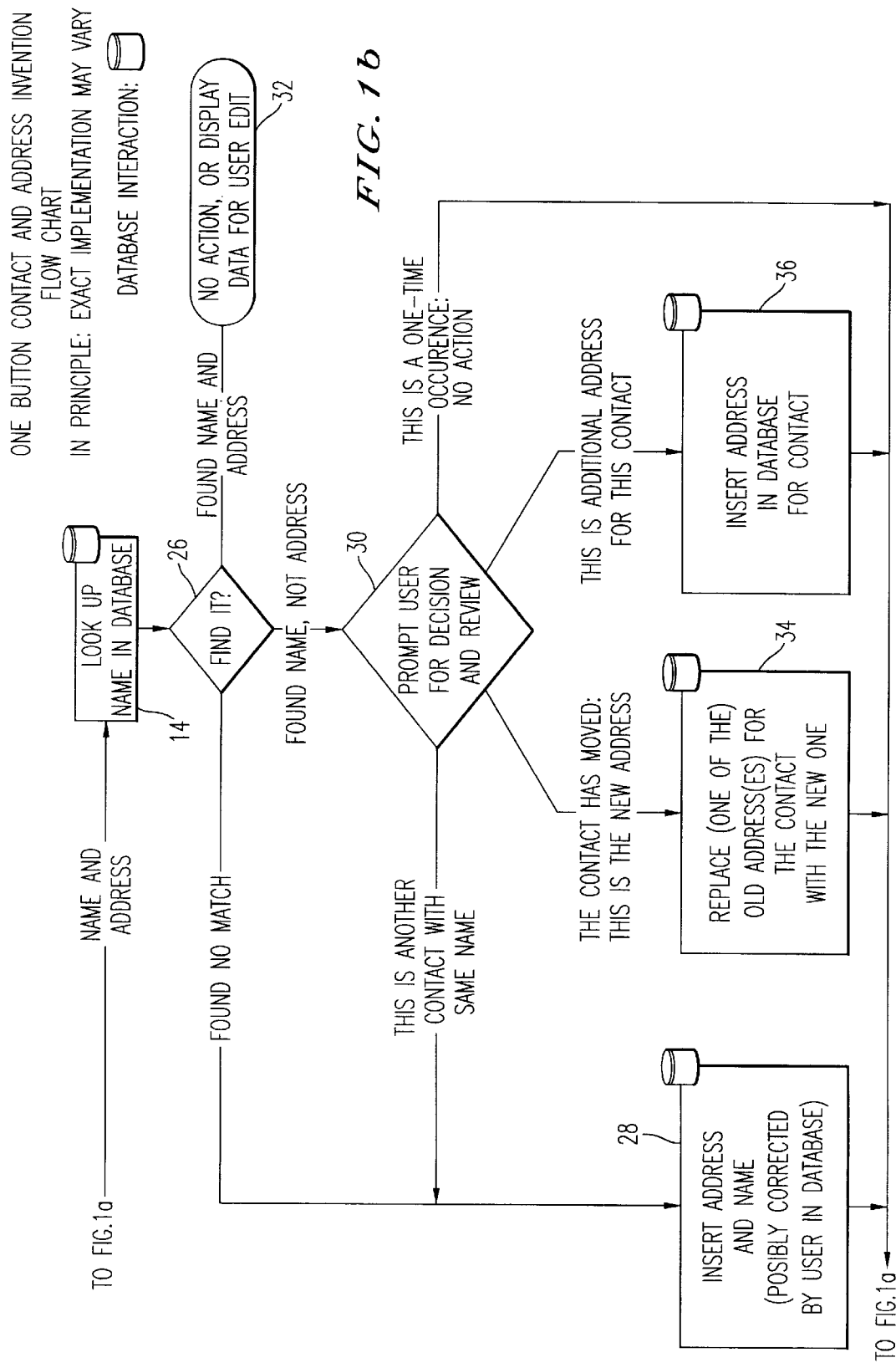
Figure 2A:
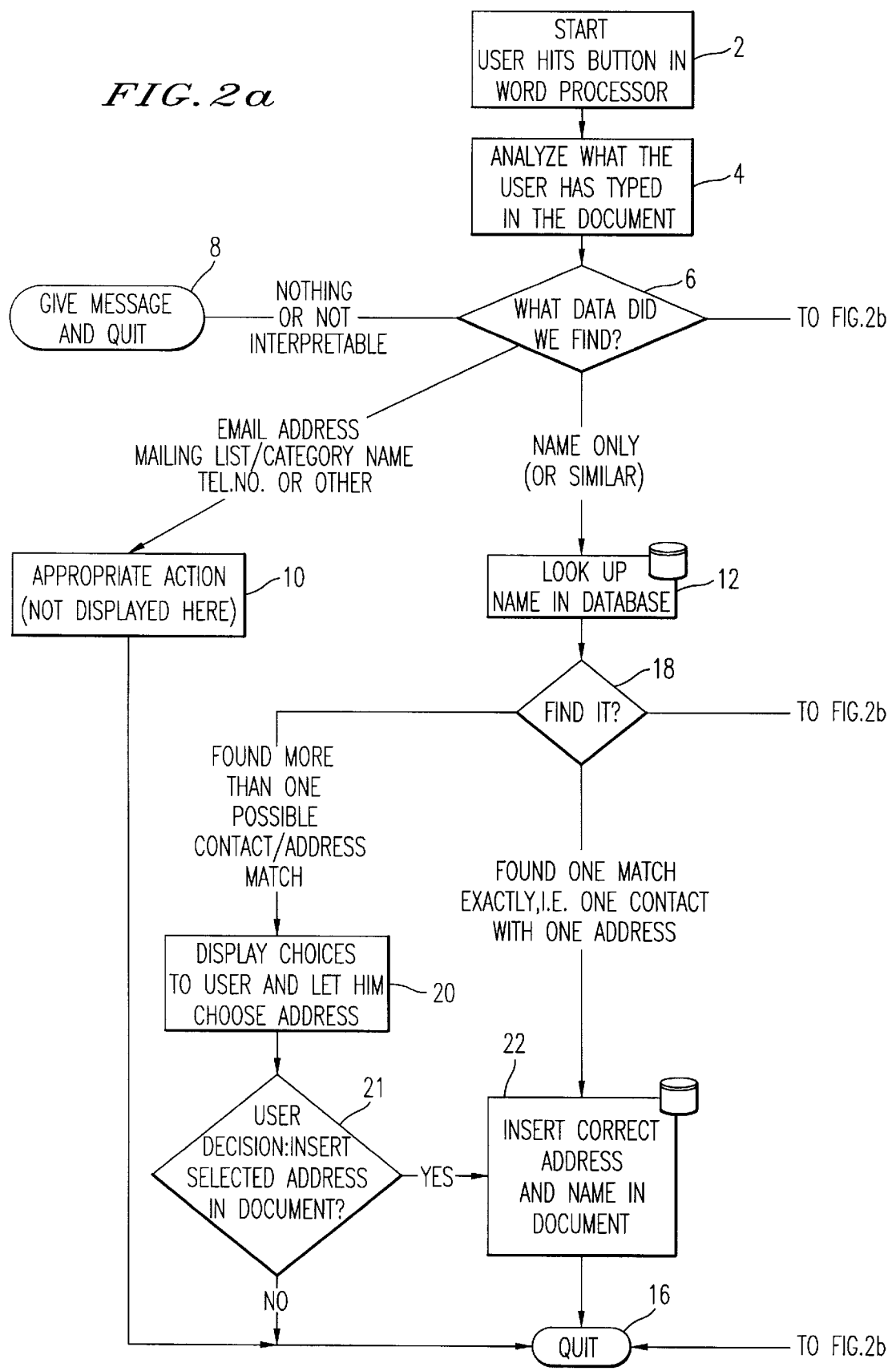
FIG. 2 is a flow chart illustrating a method for address handling within a computer program, according to another exemplary embodiment of the present invention.

Referring now to the drawings, wherein like reference numerals designate identical or corresponding parts throughout the several views, and more particularly to FIGS. 1 and 2 thereof, there is illustrated flow charts of single button addressing, according to exemplary embodiments of the present invention.

In FIG. 1, after the user has inserted the address in the word processor, the user commands the button at step 2 and the program analyzes what the user has typed in the document at step 4. At step 6, the program decides what was found in the document and if the program found nothing in the document or what it found was un-interpretable the program goes to step 8 and outputs an appropriate message to the user and then quits at step 16. The program analyzes what the user has typed in the document at step 4, for example, by analyzing (i) paragraph/line separations/formatting, etc.; (ii) street, avenue, drive, lane, boulevard, city, state, zip code, country designators and abbreviations, etc.; (iii) Mr., Mrs., Sir, Madam, Jr., Sr. designators and abbreviations, etc.; (iv) Inc., Ltd., P.C., L.L.C, designators and abbreviations, etc.; and (v) a database of common male/female names, etc.

If the program finds an e-mail address mailing list/category name telephone number or other information, at step 10 an appropriate action is performed by the program and then the program execution quits at step 16. If the program only finds a name or initials, or the like, the program looks up the name in the database at step 12 and at step 18 the program determines what was found. If the program finds more than one possible contact/address match, at step 20 the program displays menu choices to the user to let him choose an appropriate answer. Then at step 22 the program inserts a correct address and name in the document and then at step 16 the program quits execution. If the program finds one match exactly, i.e., one contact with one address, the program inserts the correct address and name in the document at step 22 and then quits execution at step 16. If the program does not find a name in the database, at step 24 the program prompts the user to specify an address and then quits execution at step 16. If the program at step 6 finds a name and an address, at step 14 the name is looked up in the database. Then, at step 26, if no match is found, at step 28 the program inserts an address and a name which are possibly corrected by the user into the database and then quits execution at step 16. If at step 26, the name and address is found, at step 32 the program either takes no action or displays the data for the user to edit. If at step 26, the name is found but not the address, the program prompts the user for a decision at step 30. If the user decides that this another contact with a same name, the program goes to step 28. If the user decides that this is a one time occurrence, no action is taken and the program quits at step 16. If the user decides that the contact has, for example, moved and that this is a new address, at step 34 one of the old addresses for the contact is replaced with the new one and the program quits at step 16. If the user decides that this is an additional address for the contact, at step 36 the additional address is inserted into the database for that contact and execution quits at step 16.

The flowchart shown in FIG. 2 is similar to the flowchart in FIG. 1, except for some additional steps which will now be discussed. At step 6, if the program only finds a name or a similar name then the name is looked up in the database at step 12, then at step 18 if the program found more than one possible contact/address match, the program displays choices to the user to let him choose an address at step 20. Then at step 21 the user decides whether to insert the selected address into the document. If the user does not decide to select the address into the document the program quits execution at step 16. If the user decides to insert the selected address into the document, the program inserts the address and name into the document at step 22 and then quits at step 16.

If the program finds a name and address in the database at step 6, then at step 14 the program looks up the name in the database and at step 26 the program determines what it has found. If the program does not find the name at step 26, at step 27 the program prompts the user for a decision and review and whether to insert the contact and address. If the user does not decide to insert the contact address, the program quits at step 16. If the user decides to insert the contact address, at step 28 the program inserts the address and name which may be possibly corrected by the user or program in the database and then execution quits at step 16.

If at step 26 the program finds a name and not an address, then at step 29 the name is looked up in the database. Then at step 31 the program decides whether this contact has another address. If the contact does not have another address, at step 33 the program prompts the user for a decision and review and whether to add the address. If the user does not want to add the address at step 33, the program quits at step 16. If the user wants to add the address at step 33 because this is an additional address for the contact, at step 36 the address is inserted in the database for the contact and execution quits at step 16.

At step 30, if the user decides that this is another contact with a same name, then the program goes to step 28. If at step 30 the user decides that this is a one time occurrence, then the program quits at step 16. If at step 30, the user decides that the contact has, for example, moved, the program goes to step 34. If at step 30, the user decides that this is an additional address for the contact, at step 36 the program inserts the address in the database for the contact and then quits at step 16.

Various exemplary screen shots which are generated during execution of the program, according to the present invention, will now be described with reference to FIGS. 3–15 and examples 1–7 as follows.

EXAMPLE 1

Figure 3:
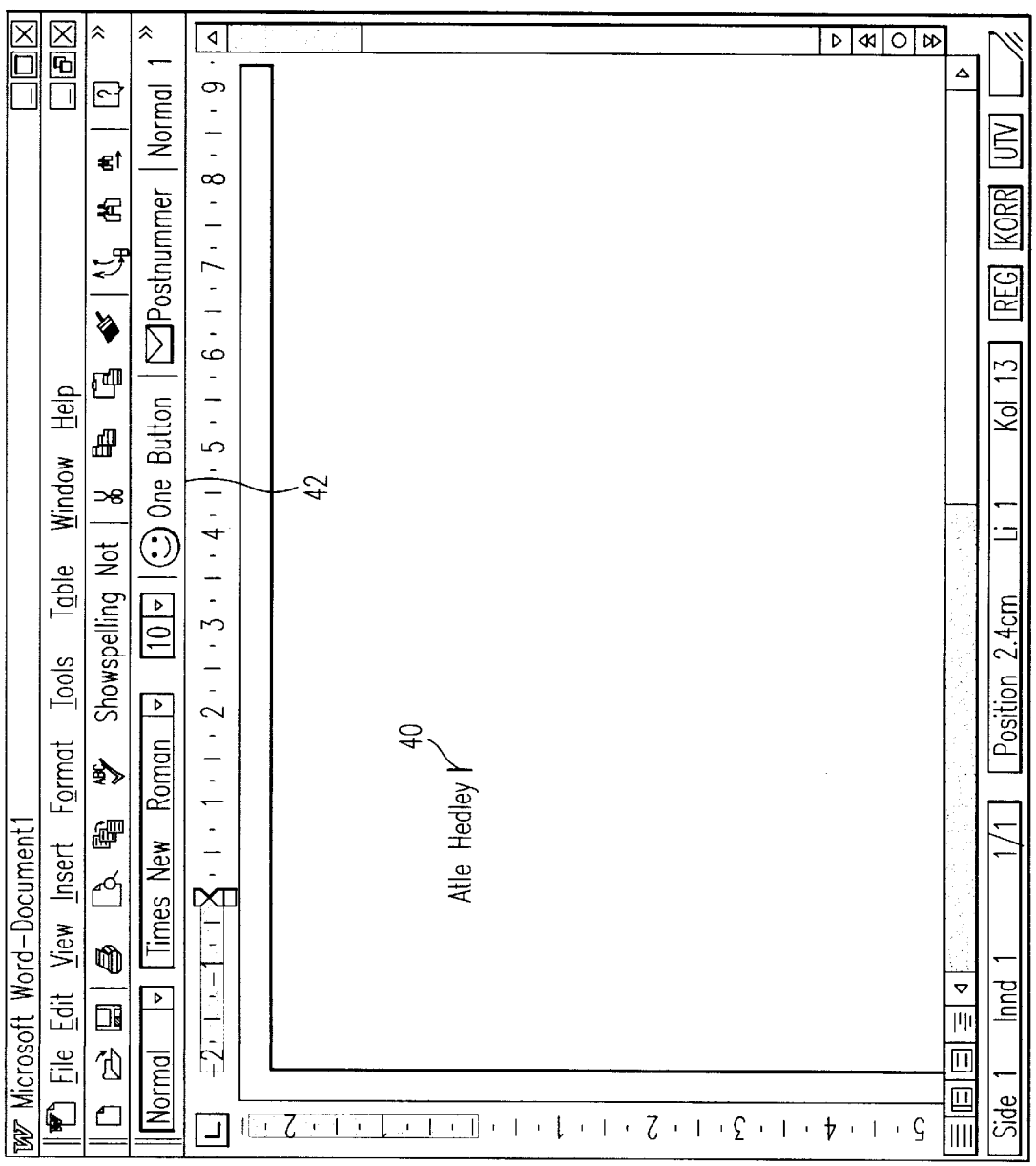
FIG. 3 is a screen shot illustrating the inputting of a name to be searched and an address handling button within a word processor, according to an exemplary embodiment of the present invention.

Retrieving an Existing Address from the Database:

FIG. 3 illustrates a starting point in word processor document, such as a WORD™ document, wherein the user has typed a name 40. The user hits the button 42, for example, marked "OneButton" and the program according to the present invention retrieves the name 40 from the document, searches a database for the name 40, and inserts the retrieved address 44 associated with the name 40 into the document as shown in, for example, FIG. 4.

The above example corresponds to steps 2, 4, 6, 12, 18, 22 and 16 in the flow charts of FIGS. 1 and 2.

EXAMPLE 2

Figure 5:
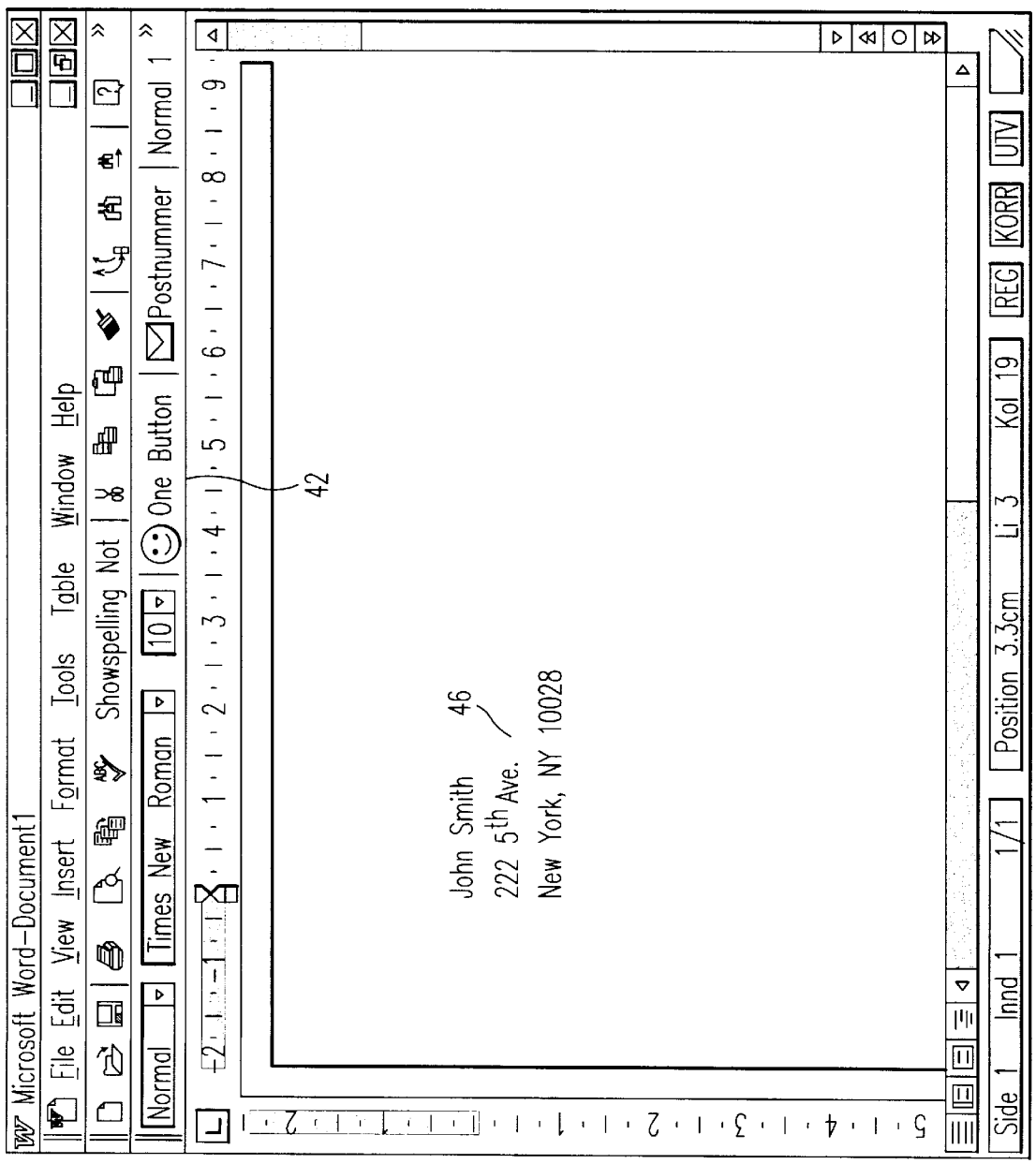
FIG. 5 is a screen shot illustrating the inputting of a name and address to be searched and an address handling button within a word processor, according to an exemplary embodiment of the present invention.
Figure 6:
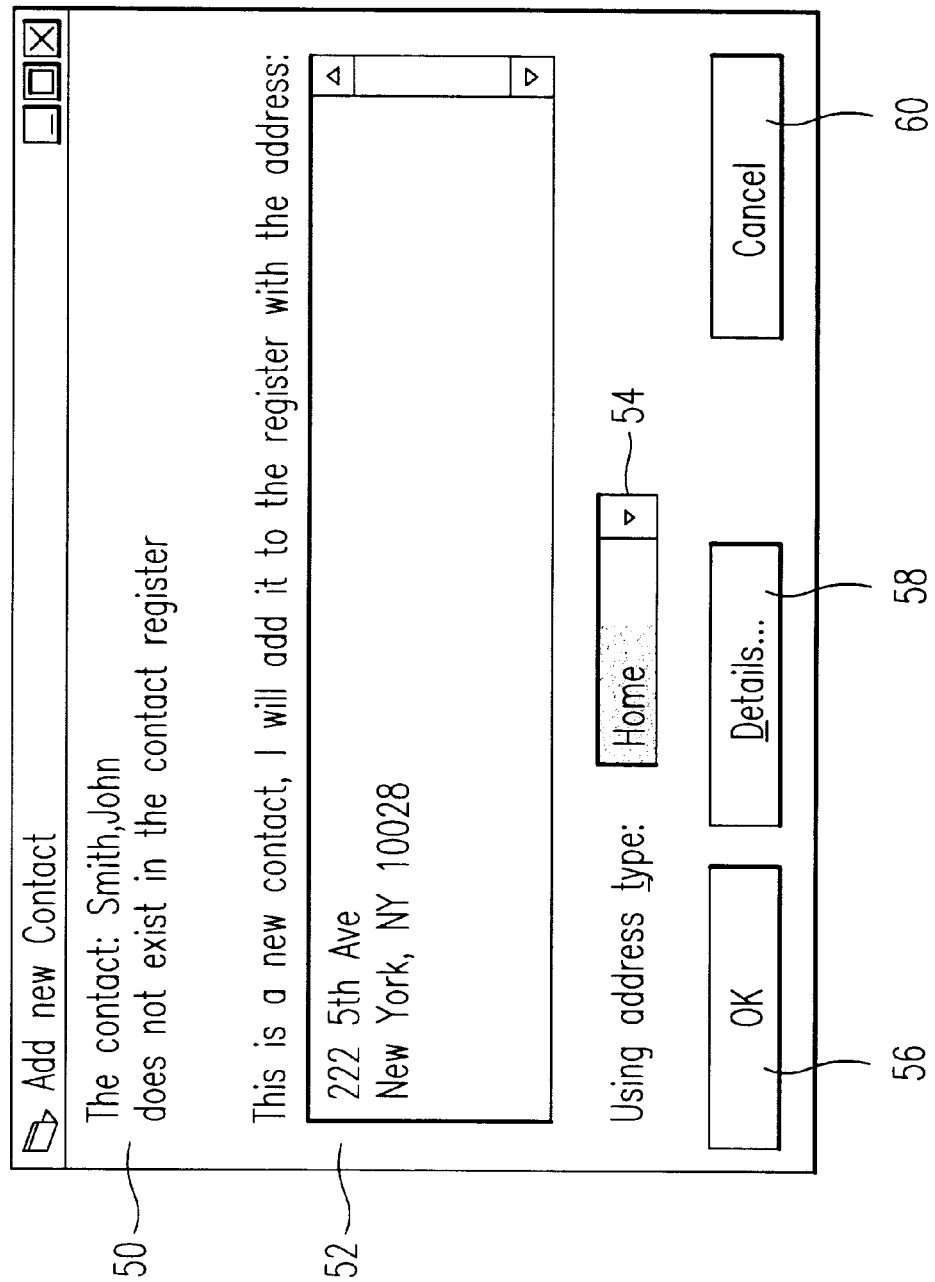
FIG. 6 is a screen shot illustrating an add new contact message window, according to an exemplary embodiment of the present invention.
Figure 7:
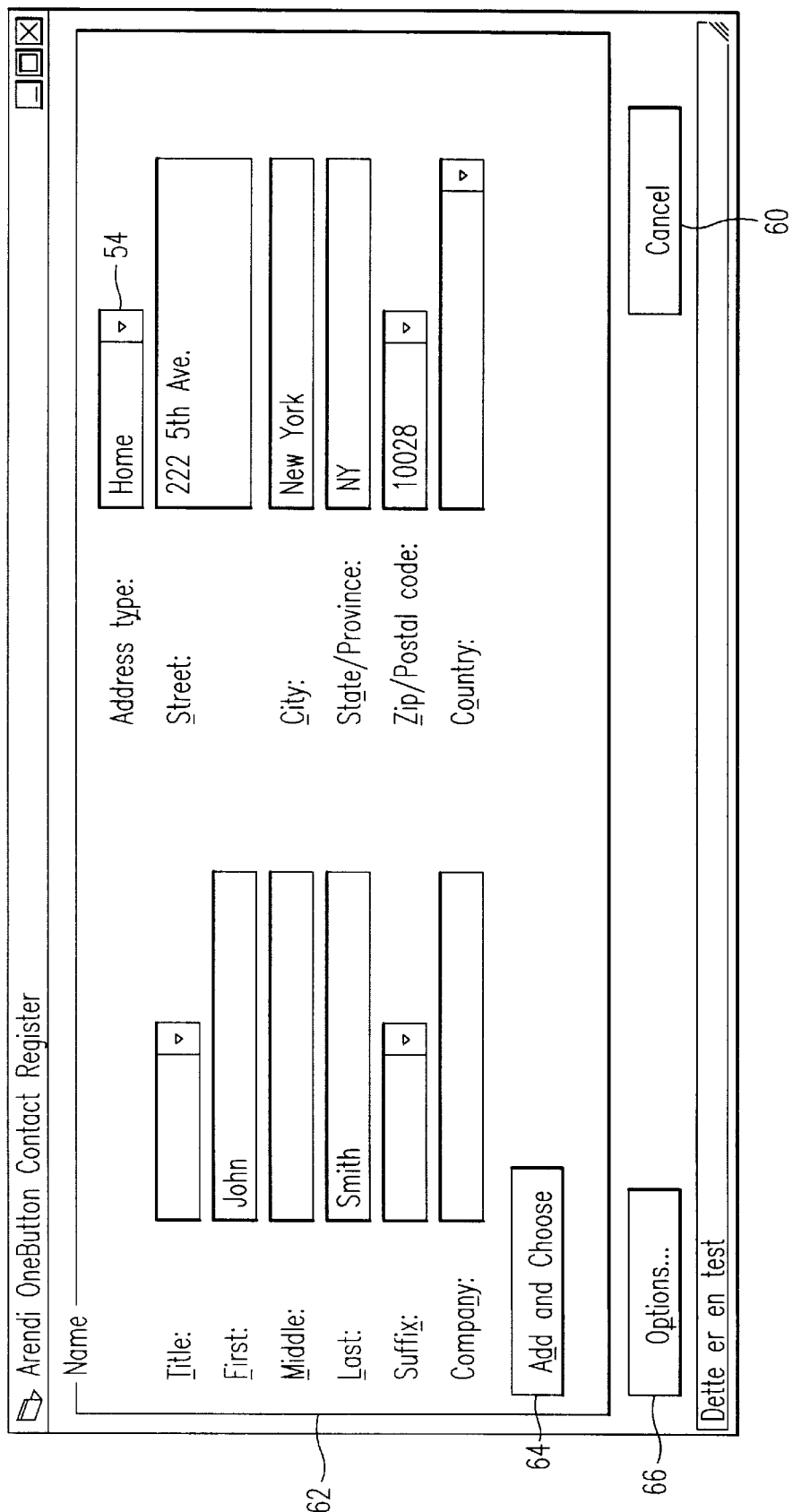
FIG. 7 is a screen shot illustrating a contact register message window, according to an exemplary embodiment of the present invention.
Figure 8:
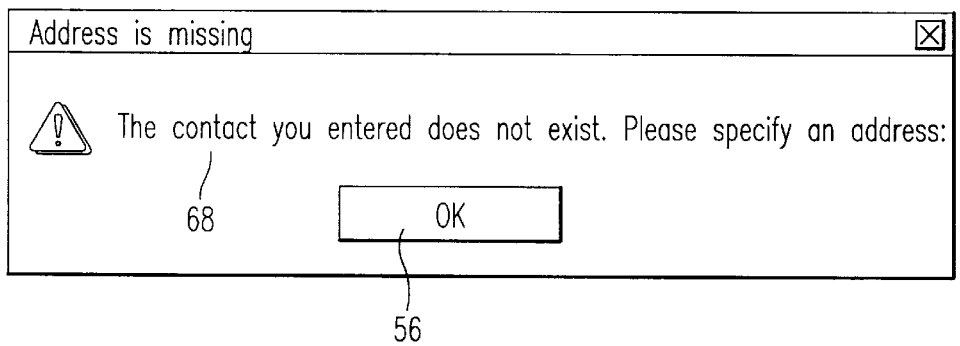
FIG. 8 is a screen shot illustrating an address missing message window, according to an exemplary embodiment of the present invention.
Figure 9:
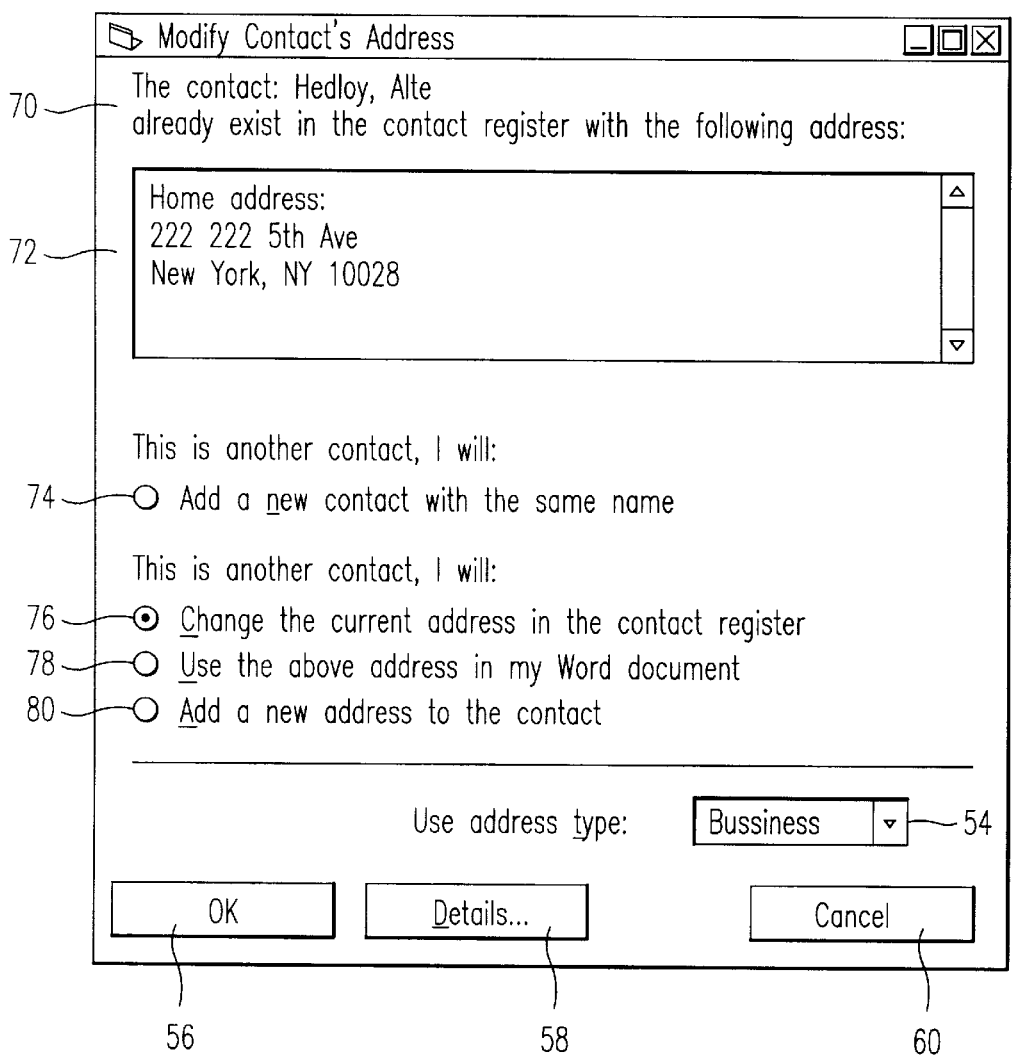
FIG. 9 is a screen shot illustrating a modify contact's address message window, according to an exemplary embodiment of the present invention.

Adding a New Contact to the Database:

FIG. 5 illustrates a starting point in word processor document, such as a WORD™ document, wherein the user has typed a name and address of a new contact 46. The user commands the button 42, for example, marked "OneButton," and the program according to the invention retrieves the new contact 46 from the document, searches a database for the name of the new contact 46 and generates a screen as shown in, for example, FIG. 6. This screen includes a message 50 informing the user that the new contact does not exist in the database, a message 52 including the address retrieved from the document, an address type selection 54, such as home, business, etc., and "OK," "Details," and "Cancel" buttons 56, 58, and 60, respectively.

At this point, the user can cancel the operation by commanding the Cancel button 60, ask the program to store data in the database and return to the document by commanding the OK button 56, or check details before storing data into the database by commanding the Details button 58. If the user commands the Details button 58, as shown in, for example, FIG. 7, a message screen is provided so that the user can review and edit data 62 and the selection 54, store the data 62 and 54 in the database by commanding a "Add and Choose" button 64, see more options by commanding an "Options" button 66, or cancel the operation by commanding the Cancel button 60.

The above example corresponds to steps 2, 4, 6, 14, 26, 28 and 16 in the flow chart of FIG. 1 and steps 2, 4, 6, 14, 26, 27, 28 and 16 in the flow chart of FIG. 2.

EXAMPLE 3

Try to Retrieve Existing Address, but Contact is not in Database:

FIG. 3 illustrates a starting point in word processor document, such as a WORD™ document, wherein the user has typed a name of a contact 40. The user commands the button 42, for example, marked "OneButton," and the program according to the present invention retrieves the name 40 from the document, searches a database for the name of the contact 40 and generates a screen as shown in, for example, FIG. 8. This screen includes a message 68 informing the user that the contact does not exist in the database and to specify an address, and "OK" buttons 56. At this point when the user commands the OK button 56, the user returns to the document so that the contact's address can be included as in Example 2 above.

The above example corresponds to steps 2, 4, 6, 12, 18, 24 and 16 in the flow charts of FIGS. 1 and 2.

EXAMPLE 4

Figure 4:
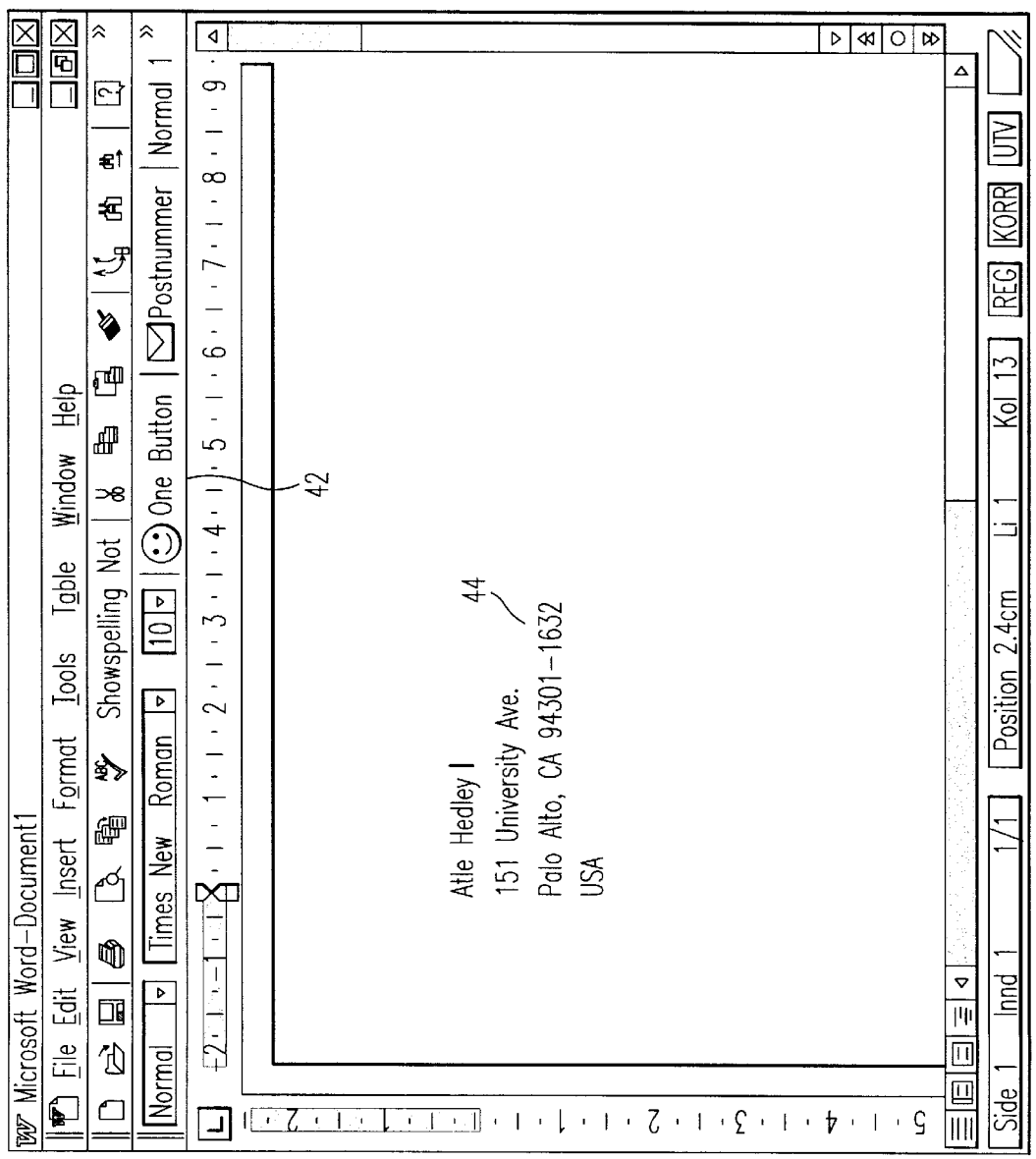
FIG. 4 is a screen shot illustrating a retrieved address in a word processor, according to an exemplary embodiment of the present invention.

Adding a New Address for an Existing Contact (short version):

FIG. 4 illustrates a starting point in word processor document, such as a WORD™ document, wherein the user has typed a name and new address of an existing contact 44. The user commands the button 42, for example, marked "OneButton," and the program according to the present invention retrieves the existing contact 44 from the document, searches a database for the name of the existing contact 44 and generates a screen as shown in, for example, FIG. 9. This screen includes a message 70 informing the user that the contact already exits in the database with an existing address, a message 72 including the existing address, add new contact with same name selection 74, change existing address selection 76, use existing address in document selection 78, add the new address to contact selection 80, the address type selection 54, such as home, business, etc., and the "OK," "Details," and "Cancel" buttons 56, 58, and 60 respectively. At this point, the user may select one of the four options 74–80, and command the OK button 56 to execute the selected options. The user can also cancel the operation by commanding the Cancel button 60, or check details before storing data into the database by commanding the Details button 58.

The above example corresponds to steps 2, 4, 6, 14, 26, 28, 30, 34, 36, and 16 in the flow chart of FIG. 1 and steps 2, 4, 6, 14, 26, 29, 31, 30, 28, 34, 36, and 16 in the flow chart of FIG. 2.

EXAMPLE 5

Selecting Between Several Possible Matching Addresses:

FIG. 3 illustrates a starting point in word processor document, such as a WORD™ document, wherein the user has typed a name and possibly address of at least one existing contact 40. The user commands the button 42, for example, marked "OneButton," and the program according to the present invention retrieves the existing contact 40 from the document, searches a database for the name of the existing contact 40 and generates a screen as shown in, for example, FIG. 10. This screen includes a message informing the user that the name corresponds to several addresses and possible contacts which already exist in the database, with existing contacts and addresses for selection 82, a message 84 including the full name and address for the contact that the user selects in 82, the Options button 66, a "Choose" button 86, a "Full details" button 88, a "More>>>" button 90, and the Cancel button 60. The above screen indicates to the user that at least one contact with the same name exists, and that there are more than one addresses and/or contacts that match.

At this point, the user may command the Choose button 86 to use the selected address and return to the document, or the user may command the More>>> button 90 to view how the program interpreted what the user typed in the word processor, and possibly change this data, wherein the program generates an updated screen as shown in, for example, FIG. 11. The updated screen includes the data 62 which displays the name typed in the word processor as interpreted by the program, address fields, and the fields for the address type selection 54, such as home, business, etc., which may be changed by the user before the program stores it in the database, the Add and Choose button 64, a "<<<Less" button 90 corresponding to the More>>> button 90 for returning to the screen of FIG. 10, and an "Add this address to the selected contact above" button 92. The user might then command the Add this address to the selected contact above button 92 and the result in the word processor is illustrated in FIG. 4. The user can also cancel the operation by commanding the Cancel button 60, or command the add choose button 64 to add this name and address as a new contact and address, or open the database before storing data into the database by commanding a "Full details" button 88 as will be later described.

The above example corresponds to steps 2, 4, 6, 12, 18, 20, 22, and 16 in the flow chart of FIG. 1 and steps 2, 4, 6, 12, 18, 20, 21, 22, and 16 in the flow chart of FIG. 2.

EXAMPLE 6

Adding a New Address for an Existing Contact (long version):

FIG. 4 illustrates a starting point in word processor document, such as a WORD™ document, wherein the user has typed a name and new address of an existing contact 44. The user commands the button 42, for example, marked "OneButton," and the program according to the present invention retrieves the existing contact 44 from the document, searches a database for the name of the existing contact 44 and generates a screen as shown in, for example, FIG. 9. As previously described, the screen includes a message 70 informing the user that the contact already exits in the database with an existing address, and the user may command the Details button 58 to see the details of the new address for potentially modify the details before they are stored in the database and the program generates a screen as shown in, for example, FIG. 10. From this screen, the user may choose to use another address than the one he typed, and return to the document, or the user may command the "Full details" button 88 to enter a database program, such as OUTLOOK™, directly as shown in, for example, FIG. 12. In FIG. 12, the database program, such as OUTLOOK™, may include portions 94–104 for allowing the user to modify various pieces of data before they are stored in the database.

Figure 10:
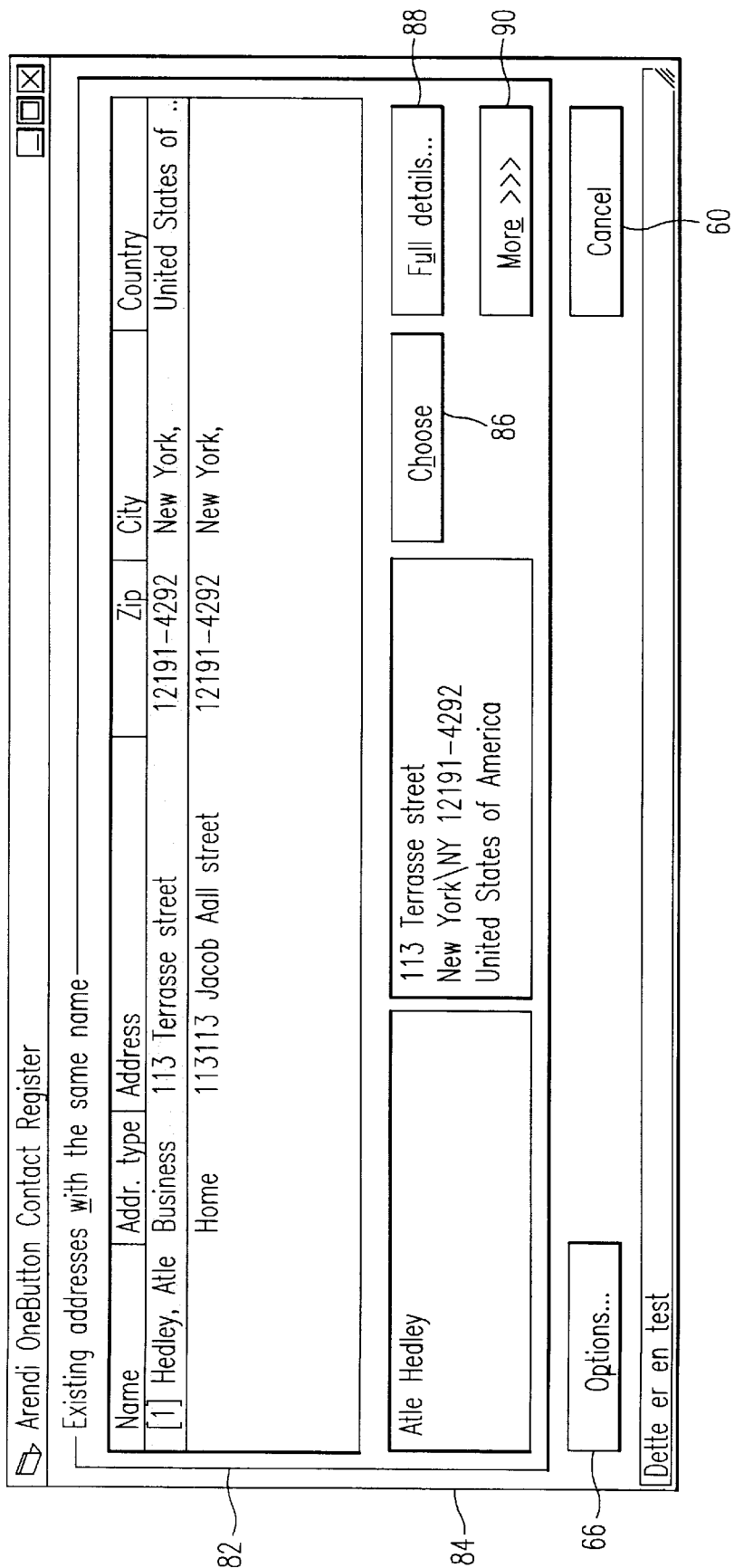
FIG. 10 is a screen shot illustrating a select a contact address register message window, according to an exemplary embodiment of the present invention.
Figure 13:
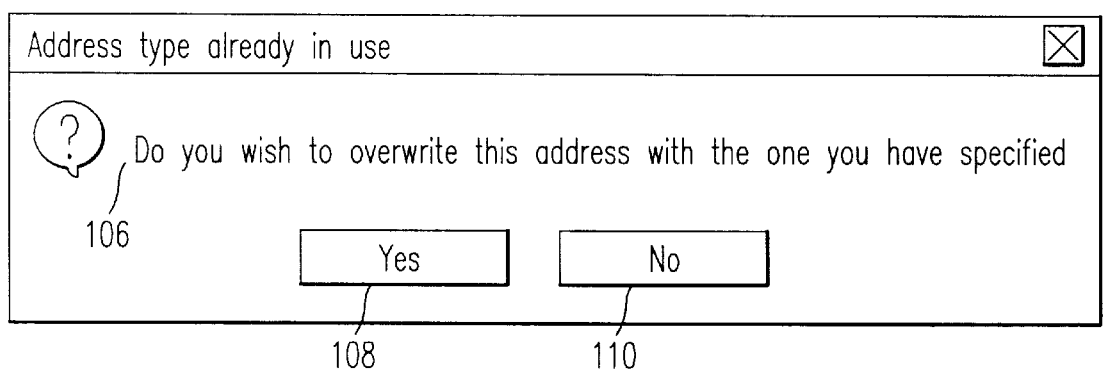
FIG. 13 is a screen shot illustrating an address already in use message window, according to an exemplary embodiment of the present invention.

Alternatively, in the screen shown in FIG. 10, the user may command the More>>> button 90 at which time the program generates the screen as shown in, for example, FIG. 11 and as previously described. In this screen, the user might then command the Add this address to the selected contact above button 92. If the address typed is already in use, the program generates a screen including a message 106, and "Yes" and "No" buttons, 108 and 110, respectively, as shown in, for example, FIG. 13. If the user hits the Yes button 108 the program overwrites the contact address with the address specified by the user (e.g., if the contact has moved) and the result in the word processor is shown in, for example, FIG. 4.

The above example corresponds to steps 2, 4, 6, 12, 14, 26, 28, 30, 34, 36, and 16 in the flow chart of FIG. 1 and steps 2, 4, 6, 12, 14, 26, 29, 31, 30, 28, 34, 36, and 16 in the flow chart of FIG. 2.

EXAMPLE 7

Figure 14:
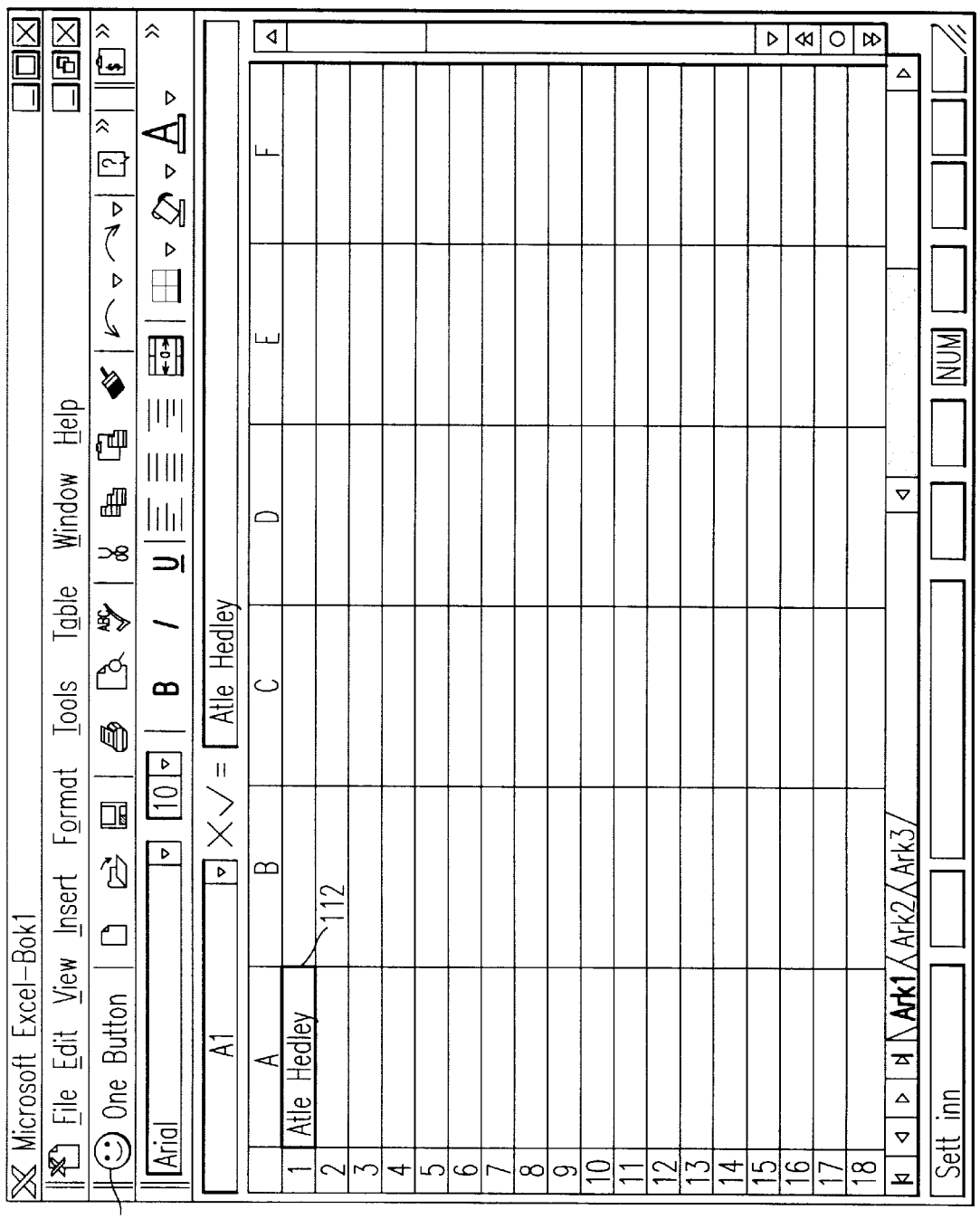
FIG. 14 is a screen shot illustrating the inputting of a name to be searched and an address handling button within a spreadsheet, according to an exemplary embodiment of the present invention.
Figure 15:
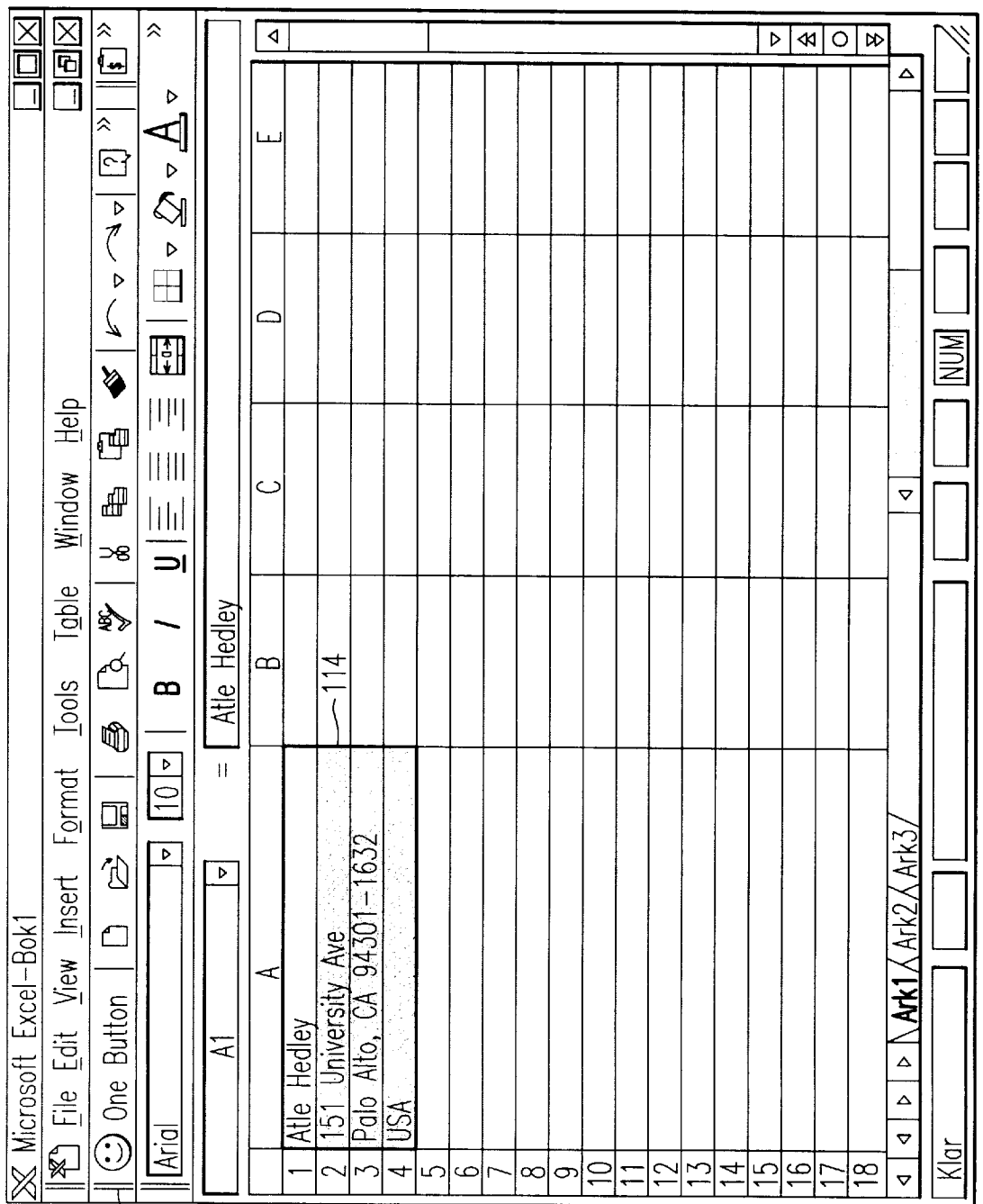
FIG. 15 is a screen shot illustrating a retrieved address in a spreadsheet, according to an exemplary embodiment of the present invention.

Spreadsheet Application:

FIG. 14 illustrates a starting point in word processor document, such as an EXCEL™ spreadsheet, wherein the user has typed a name 112. The user hits the button 42, for example, marked "OneButton," and the program according to the present invention retrieves the name 112 from the spreadsheet, searches a database for the name 112, and inserts the retrieved address 114 into the spreadsheet as shown in, for example, FIG. 15. Accordingly, the examples 1–6 apply not only to word processor documents, such as WORD™ documents, etc., but to other word processor documents, and spread sheets, such as EXCEL™ spreadsheets, etc.

The above example corresponds to steps 2, 4, 6, 12, 18, 22 and 16 in the flow charts of FIGS. 1 and 2.

Figure 16:
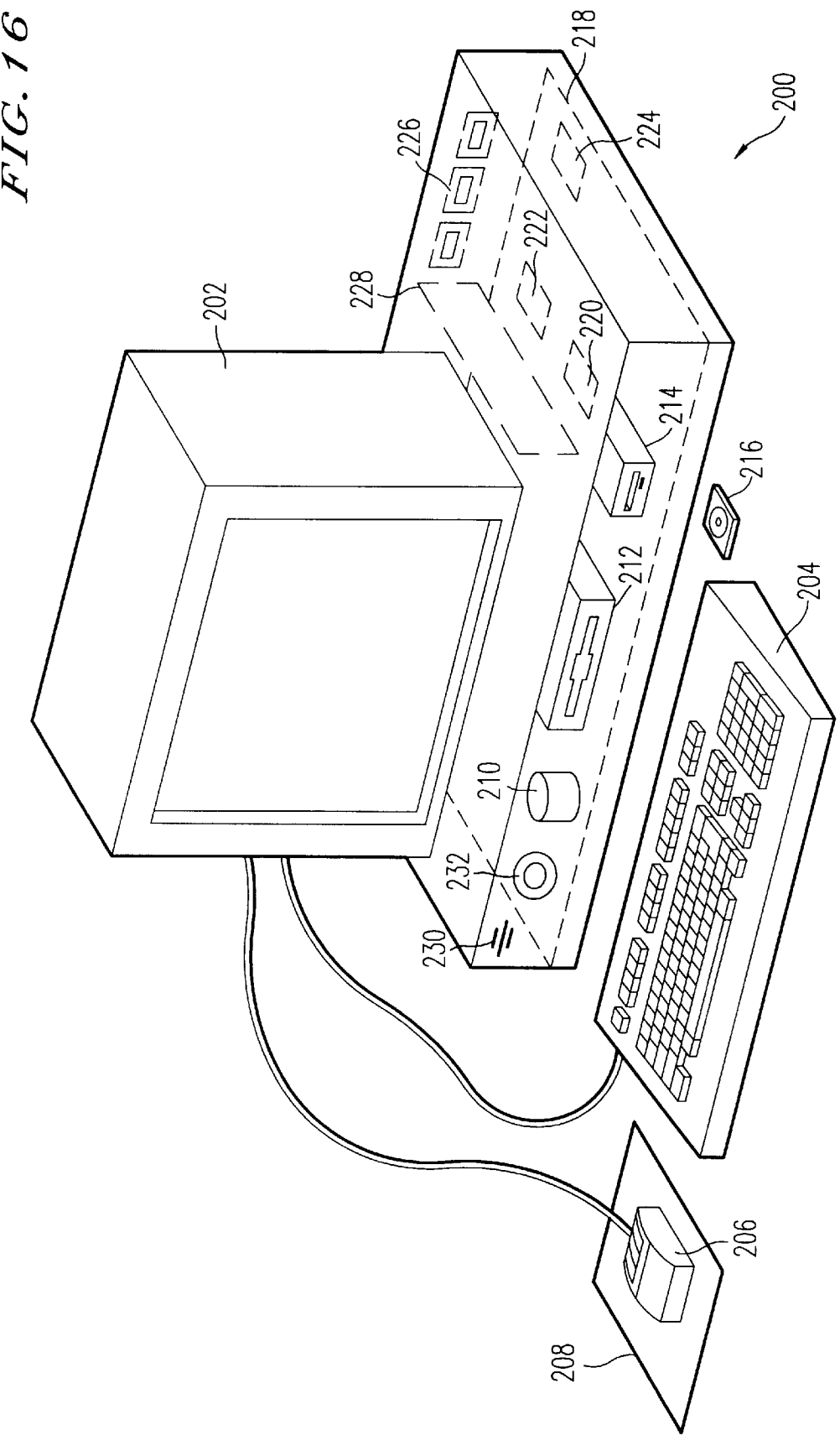
FIG. 16 is a schematic illustration of a general purpose computer for performing the processes of the present invention, according to an exemplary embodiment of the present invention.

FIG. 16 is a schematic illustration of a computer system for implementing the single button addressing according to the present invention. A computer 200 implements the method of the present invention, wherein the computer includes, for example, a display device 202, such as a conventional display device or a touch screen monitor with a touch-screen interface, etc., a keyboard 204, a pointing device 206, a mouse pad or digitizing pad 208, a hard disk 210, or other fixed, high density media drives, connected using an appropriate device bus (e.g., a SCSI bus, an Enhanced IDE bus, an Ultra DMA bus, a PCI bus, etc.), a floppy drive 212, a tape or CD ROM drive 214 with tape or CD media 216, or other removable media devices, such as magneto-optical media, etc., and a mother board 218. The mother board 218 includes, for example, a processor 220, a RAM 222, and a ROM 224 (e.g., DRAM, ROM, EPROM, EEPROM, SRAM, SDRAM, and Flash RAM, etc.), I/O ports 226 which may be used to couple to external devices, networks, etc., (not shown), and optional special purpose logic devices (e.g., ASICs) or configurable logic devices (e.g., GAL and re-programmable FPGA) 228 for performing specialized hardware/software functions, such as sound processing, image processing, signal processing, neural network processing, object character recognition (OCR) processing, etc., a microphone 230, and a speaker or speakers 232.

As stated above, the system includes at least one computer readable medium, or alternatively, the computer readable medium may be accessed through various paths, such as networks, internet, drives, etc. Examples of computer readable media are compact discs, hard disks, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 200 and for enabling the computer 200 to interact with a human user. Such software may include, but is not limited to, device drivers, operating systems and user applications, such as development tools. Such computer readable media further includes the computer program product of the present invention for performing any of the processes according to the present invention, described above (see, e.g., FIGS. 1–15). The computer code devices of the present invention can be any interpreted or executable code mechanism, including but not limited to, scripts, interpreters, dynamic link libraries, Java classes, and complete executable programs, etc.

The invention may also be implemented by the preparation of application specific integrated circuits or by interconnecting an appropriate network of conventional component circuits, as will be readily apparent to those skilled in the art.

Address handling, according to this invention, is a significant simplification relative to existing methods, and requires little or no training on the part of a user, as correct addresses are retrieved with a minimal number of user commands, "clicks", keystrokes, etc. In addition, a program according to the present invention, can be programmed and created in most existing programming languages and be connected to most modern word processors. Therefore, according to the present invention, the process of creating and updating records in an address database is significantly simplified, since this may now be performed directly from the word processor.

Although the present invention is defined in terms of word processing documents, such as WORD™ documents and EXCEL™ spreadsheets, the present invention is applicable to all types of word processing documents, such as NOTEPAD™, WORDPAD™, WORDPERFECT™, QUATROPRO™, AMIPRO™, etc., as will be readily apparent to those skilled in the art.

Although the present invention is defined in terms of information management or database programs, such as OUTLOOK™, etc., the present invention is applicable to all types of information management or database programs, such as ACCESS™, ORACLE™, DBASE™, RBASE™, CARDFILE™, including "flat files," etc., as will be readily apparent to those skilled in the art.

Although the present invention is defined in terms of providing an input device, such as a button 42 in a word processor for address handling therein, the present invention may be practiced with all types of input devices, such as a touch screen, keyboard button, icon, menu, voice command device, etc., as will be readily apparent to those skilled in the art.

Although the present invention is defined in terms of a program retrieving information from a document before searching a database, the user may select the information in the document to be searched by the program in the database (e.g., by highlighting, selecting, italicizing, underlining, etc.), as will be readily apparent to those skilled in the art.

Although the present invention is defined in terms of a program retrieving a name or portion thereof from a document before searching a database, the program may retrieve an address or portion thereof from the document before searching the database and insert, correct, complete, etc., the retrieved address based on the information found in the database corresponding to the retrieved address or portion thereof, as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

This application claims priority and contains subject matter related to Norwegian patent application No. 984066 filed on Sep. 3, 1998, the entire contents of which are hereby incorporated by reference.

What is claimed as new and desired to be secured by Letters Patent of the United States is:

1. A computerized method for information handling within a document created using an application program, the document including first information provided therein, the method comprising:

providing a record retrieval program;

providing an input device configured to enter an execute command which initiates a record retrieval from an information source using the record retrieval program;

upon a single entry of the execute command by means of the input device:

analyzing the document to determine if the first information is contained therein, and if the first information is contained in the document, searching, using the record retrieval program, the information source for second information associated with the first information; and when the information source includes second information associated with the first information, performing at least one of, (a) displaying the second information, (b) inserting the second information in the document, and (c) completing the first information in the document based on the second information.

2. The method of claim 1, further comprising one of the following steps:

storing the first information in the information source if no second information associated with the first information is found in the information source during said searching step, changing the second information in the information source based on one of differences and similarities between the first information and the second information, completing the first information in the document using the second information, adding one of all and part of the first information to an existing record in the information source associated with one of all and part of the first information, correcting the first information in the document using the second information, adding information about said document to said information source, and adding information about said document to said information source, said added information associated with said second information.

3. The method of claim 1, wherein said second information includes at least one of a zip code, a city, a state, a county, a country, a street name, a house number, an apartment number, a telephone number, an email address and abbreviations or misspellings thereof, further comprising:

performing at least one of completing and correcting at least one of a zip code, a city, a state, a county, a country, a street name, a house number, an apartment number, a telephone number, an email address and abbreviations or misspellings thereof in the first information based on the second information.

4. The method of claim 1, where in said second information includes at least one of a zip code, a city, a state, a county, a country, a street name, a house number, an apartment number, a telephone number, an email address and abbreviations or misspellings thereof, further comprising:

performing at least one of completing and correcting at least one of a zip code, a city, a state, a county, a country, a street name, a house number, an apartment number, a telephone number, an email address and abbreviations or misspellings thereof in the first information based on the second information automatically.

5. The method of claim 1, where in said second information includes at least one of a zip code, a city, a state, a county, a country, a street name, a house number, an apartment number, a telephone number, an email address and abbreviations or misspellings thereof, further comprising:

performing at least one of completing and correcting at least one of a zip code, a city, a state, a county, a country, a street name, a house number, an apartment number, a telephone number, an email address and abbreviations or misspellings thereof in the first information based on the second information with assistance from a user.

6. The method of claim 1, wherein said first information includes an identification of a list of addressees, further comprising:

addressing said document to all of said addressees based on the second information associated with said identification of said list of addressees.

7. The method of claim 1, further comprising:

providing a user the option of making changes to the second information directly in the information source.

8. The method of claim 1, wherein:

the step of using said application program comprises using said application program to enter first information comprising one of a person's name, a person's title, a person's name and address, a business name, a business name and address, a telephone number, and an email address, or a part thereof, into said document; and the step of searching comprises searching, using the record retrieval program, the information source for second information comprising one of a person's name, a person's title, a person's name and address, a business name, a business name and address, a telephone number, and an email address, associated with the first information.

9. The method of claim 1, wherein:

the step of providing an input device comprises providing an input device comprising one of a touch screen, a keyboard button, an icon, a menu and a voice command device, and configured to enter an execute command which initiates a record retrieval from an information source using the record retrieval program; and the step of displaying the second information comprises displaying the second information comprising one of displaying a message screen with the second information and providing a voiced response of the second information.

10. The method of claim 1, wherein the step of using said application program comprises:

using one of a word processing program and a spreadsheet program to enter first information into a respective one of a word processing document and a spreadsheet document.

11. The method of claim 1, wherein the step of providing an input device comprises:

providing an input device configured to enter an execute command which initiates a record retrieval from an information source comprising at least one of a file, a database, a database program, a computer network, and a contact management program, using the record retrieval program.

12. The method of claim 1, wherein said first information includes an identification of a list of addressees, further comprising:

creating copies of said document, each addressed to one of addressees in said list identified by said first information, based on said second information associated with said identification of said list of addressees.

13. The method of claim 1, further comprising the step of indicating which part of information in said document is said first information.

14. The method of claim 1, further comprising the step of automatically interpreting which part of information in said document is said first information.

15. A computer system configured to perform the steps recited in one of claims 1–14.

16. A storage medium storing a program for performing the steps recited in one of claims 1–14.

17. The method of claim 2, wherein:

the step of using said application program comprises using said application program to enter first information comprising one of a person's name, a person's title, a person's name and address, a business name, a business name and address, a telephone number, and an email address, or a part thereof, into said document; and the step of searching comprises searching, using the record retrieval program, the information source for second information comprising one of a person's name, a person's title, a person's name and address, a business name, a business name and address, a telephone number, and an email address, associated with the first information.

18. The method of claim 3, wherein:

the step of using said application program comprises using said application program to enter first information comprising one of a person's name, a person's title, a person's name and address, a business name, a business name and address, a telephone number, and an email address, or a part thereof, into said document; and the step of searching comprises searching, using the record retrieval program, the information source for second information comprising one of a person's name, a person's title, a person's name and address, a business name, a business name and address, a telephone number, and an email address, associated with the first information.

19. The method of claim 4, wherein:

the step of using said application program comprises using said application program to enter first information comprising one of a person's name, a person's title, a person's name and address, a business name, a business name and address, a telephone number, and an email address, or a part thereof, into said document; and the step of searching comprises searching, using the record retrieval program, the information source for second information comprising one of a person's name, a person's title, a person's name and address, a business name, a business name and address, a telephone number, and an email address, associated with the first information.

20. The method of claim 5, wherein:

the step of using said application program comprises using said application program to enter first information comprising one of a person's name, a person's title, a person's name and address, a business name, a business name and address, a telephone number, and an email address, or a part thereof, into said document; and the step of searching comprises searching, using the record retrieval program, the information source for second information comprising one of a person's name, a person's title, a person's name and address, a business name, a business name and address, a telephone number, and an email address, associated with the first information.

21. The method of claim 6, wherein:

the step of using said application program comprises using said application program to enter first information comprising one of a person's name, a person's title, a person's name and address, a business name, a business name and address, a telephone number, and an email address, or a part thereof, into said document; and the step of searching comprises searching, using the record retrieval program, the information source for second information comprising one of a person's name, a person's title, a person's name and address, a business name, a business name and address, a telephone number, and an email address, associated with the first information.

22. The method of claim 7, wherein:

the step of using said application program comprises using said application program to enter first information comprising one of a person's name, a person's title, a person's name and address, a business name, a business name and address, a telephone number, and an email address, or a part thereof, into said document; and the step of searching comprises searching, using the record retrieval program, the information source for second information comprising one of a person's name, a person's title, a person's name and address, a business name, a business name and address, a telephone number, and an email address, associated with the first information.

23. The method of claim 2, wherein:

the step of providing an input device comprises providing an input device comprising one of a touch screen, a keyboard button, an icon, a menu and a voice command device, and configured to enter an execute command which initiates a record retrieval from an information source using the record retrieval program; and the step of displaying the second information comprises displaying the second information comprising one of displaying a message screen with the second information and providing a voiced response of the second information.

24. The method of claim 3, wherein:

the step of providing an input device comprises providing an input device comprising one of a touch screen, a keyboard button, an icon, a menu and a voice command device, and configured to enter an execute command which initiates a record retrieval from an information source using the record retrieval program; and the step of displaying the second information comprises displaying the second information comprising one of displaying a message screen with the second information and providing a voiced response of the second information.

25. The method of claim 4, wherein:

the step of providing an input device comprises providing an input device comprising one of a touch screen, a keyboard button, an icon, a menu and a voice command device, and configured to enter an execute command which initiates a record retrieval from an information source using the record retrieval program; and the step of displaying the second information comprises displaying the second information comprising one of displaying a message screen with the second information and providing a voiced response of the second information.

26. The method of claim 5, wherein:

the step of providing an input device comprises providing an input device comprising one of a touch screen, a keyboard button, an icon, a menu and a voice command device, and configured to enter an execute command which initiates a record retrieval from an information source using the record retrieval program; and the step of displaying the second information comprises displaying the second information comprising one of displaying a message screen with the second information and providing a voiced response of the second information.

27. The method of claim 6, wherein:

the step of providing an input device comprises providing an input device comprising one of a touch screen, a keyboard button, an icon, a menu and a voice command device, and configured to enter an execute command which initiates a record retrieval from an information source using the record retrieval program; and the step of displaying the second information comprises displaying the second information comprising one of displaying a message screen with the second information and providing a voiced response of the second information.

28. The method of claim 7, wherein:

the step of providing an input device comprises providing an input device comprising one of a touch screen, a keyboard button, an icon, a menu and a voice command device, and configured to enter an execute command which initiates a record retrieval from an information source using the record retrieval program; and the step of displaying the second information comprises displaying the second information comprising one of displaying a message screen with the second information and providing a voiced response of the second information.

29. The method of claim 8, wherein:

the step of providing an input device comprises providing an input device comprising one of a touch screen, a keyboard button, an icon, a menu and a voice command device, and configured to enter an execute command which initiates a record retrieval from an information source using the record retrieval program; and the step of displaying the second information comprises displaying the second information comprising one of displaying a message screen with the second information and providing a voiced response of the second information.

30. The method of claim 2, wherein the step of using said application program comprises:

using one of a word processing program and a spreadsheet program to enter first information into a respective one of a word processing document and a spreadsheet document.

31. The method of claim 3, wherein the step of using said application program comprises:

using one of a word processing program and a spreadsheet program to enter first information into a respective one of a word processing document and a spreadsheet document.

32. The method of claim 4, wherein the step of using said application program comprises:

using one of a word processing program and a spreadsheet program to enter first information into a respective one of a word processing document and a spreadsheet document.

33. The method of claim 5, wherein the step of using said application program comprises:

using one of a word processing program and a spreadsheet program to enter first information into a respective one of a word processing document and a spreadsheet document.

34. The method of claim 6, wherein the step of using said application program comprises:

using one of a word processing program and a spreadsheet program to enter first information into a respective one of a word processing document and a spreadsheet document.

35. The method of claim 7, wherein the step of using said application program comprises:

using one of a word processing program and a spreadsheet program to enter first information into a respective one of a word processing document and a spreadsheet document.

36. The method of claim 8, wherein the step of using said application program comprises:

using one of a word processing program and a spreadsheet program to enter first information into a respective one of a word processing document and a spreadsheet document.

37. The method of claim 9, wherein the step of using said application program comprises:

using one of a word processing program and a spreadsheet program to enter first information into a respective one of a word processing document and a spreadsheet document.

38. The method of claim 2, wherein the step of providing an input device comprises:

providing an input device configured to enter an execute command which initiates a record retrieval from an information source comprising at least one of a file, a database, a database program, a computer network, and a contact management program, using the record retrieval program.

39. The method of claim 3, wherein the step of providing an input device comprises:

providing an input device configured to enter an execute command which initiates a record retrieval from an information source comprising at least one of a file, a database, a database program, a computer network, and a contact management program, using the record retrieval program.

40. The method of claim 4, wherein the step of providing an input device comprises:

providing an input device configured to enter an execute command which initiates a record retrieval from an information source comprising at least one of a file, a database, a database program, a computer network, and a contact management program, using the record retrieval program.

41. The method of claim 5, wherein the step of providing an input device comprises:

providing an input device configured to enter an execute command which initiates a record retrieval from an information source comprising at least one of a file, a database, a database program, a computer network, and a contact management program, using the record retrieval program.

42. The method of claim 6, wherein the step of providing an input device comprises:

providing an input device configured to enter an execute command which initiates a record retrieval from an information source comprising at least one of a file, a database, a database program, a computer network, and a contact management program, using the record retrieval program.

43. The method of claim 7, wherein the step of providing an input device comprises:

providing an input device configured to enter an execute command which initiates a record retrieval from an information source comprising at least one of a file, a database, a database program, a computer network, and a contact management program, using the record retrieval program.

44. The method of claim 8, wherein the step of providing an input device comprises:

providing an input device configured to enter an execute command which initiates a record retrieval from an information source comprising at least one of a file, a database, a database program, a computer network, and a contact management program, using the record retrieval program.

45. The method of claim 9, wherein the step of providing an input device comprises:

providing an input device configured to enter an execute command which initiates a record retrieval from an information source comprising at least one of a file, a database, a database program, a computer network, and a contact management program, using the record retrieval program.

46. The method of claim 10, wherein the step of providing an input device comprises:

providing an input device configured to enter an execute command which initiates a record retrieval from an information source comprising at least one of a file, a database, a database program, a computer network, and a contact management program, using the record retrieval program.

47. The method of claim 2, wherein said first information includes an identification of a list of addressees, further comprising:

creating copies of said document, each addressed to one of addressees in said list identified by said first information, based on said second information associated with said identification of said list of addressees.

48. The method of claim 3, wherein said first information includes an identification of a list of addressees, further comprising:

creating copies of said document, each addressed to one of addressees in said list identified by said first information, based on said second information associated with said identification of said list of addressees.

49. The method of claim 4, wherein said first information includes an identification of a list of addressees, further comprising:

creating copies of said document, each addressed to one of addressees in said list identified by said first information, based on said second information associated with said identification of said list of addressees.

50. The method of claim 5, wherein said first information includes an identification of a list of addressees, further comprising:

creating copies of said document, each addressed to one of addressees in said list identified by said first information, based on said second information associated with said identification of said list of addressees.

51. The method of claim 6, wherein said first information includes an identification of a list of addressees, further comprising:

creating copies of said document, each addressed to one of addressees in said list identified by said first information, based on said second information associated with said identification of said list of addressees.

52. The method of claim 7, wherein said first information includes an identification of a list of addressees, further comprising:

creating copies of said document, each addressed to one of addressees in said list identified by said first information, based on said second information associated with said identification of said list of addressees.

53. The method of claim 8, wherein said first information includes an identification of a list of addressees, further comprising:

creating copies of said document, each addressed to one of addressees in said list identified by said first information, based on said second information associated with said identification of said list of addressees.

54. The method of claim 9, wherein said first information includes an identification of a list of addressees, further comprising:

creating copies of said document, each addressed to one of addressees in said list identified by said first information, based on said second information associated with said identification of said list of addressees.

55. The method of claim 10, wherein said first information includes an identification of a list of addressees, further comprising:

creating copies of said document, each addressed to one of addressees in said list identified by said first information, based on said second information associated with said identification of said list of addressees.

56. The method of claim 11, wherein said first information includes an identification of a list of addressees, further comprising:

creating copies of said document, each addressed to one of addressees in said list identified by said first information, based on said second information associated with said identification of said list of addressees.

57. The method of claim 2, further comprising the step of indicating which part of information in said document is said first information.

58. The method of claim 3, further comprising the step of indicating which part of information in said document is said first information.

59. The method of claim 4, further comprising the step of indicating which part of information in said document is said first information.

60. The method of claim 5, further comprising the step of indicating which part of information in said document is said first information.

61. The method of claim 6, further comprising the step of indicating which part of information in said document is said first information.

62. The method of claim 7, further comprising the step of indicating which part of information in said document is said first information.

63. The method of claim 8, further comprising the step of indicating which part of information in said document is said first information.

64. The method of claim 9, further comprising the step of indicating which part of information in said document is said first information.

65. The method of claim 10, further comprising the step of indicating which part of information in said document is said first information.

66. The method of claim 11, further comprising the step of indicating which part of information in said document is said first information.

67. The method of claim 12, further comprising the step of indicating which part of information in said document is said first information.

68. The method of claim 2, further comprising the step of automatically interpreting which part of information in said document is said first information.

69. The method of claim 3, further comprising the step of automatically interpreting which part of information in said document is said first information.

70. The method of claim 4, further comprising the step of automatically interpreting which part of information in said document is said first information.

71. The method of claim 5, further comprising the step of automatically interpreting which part of information in said document is said first information.

72. The method of claim 6, further comprising the step of automatically interpreting which part of information in said document is said first information.

73. The method of claim 7, further comprising the step of automatically interpreting which part of information in said document is said first information.

74. The method of claim 8, further comprising the step of automatically interpreting which part of information in said document is said first information.

75. The method of claim 9, further comprising the step of automatically interpreting which part of information in said document is said first information.

76. The method of claim 10, further comprising the step of automatically interpreting which part of information in said document is said first information.

77. The method of claim 11, further comprising the step of automatically interpreting which part of information in said document is said first information.

78. The method of claim 12, further comprising the step of automatically interpreting which part of information in said document is said first information.

79. The method of claim 13, further comprising the step of automatically interpreting which part of information in said document is said first information.

* * * * *